US008366077B2

(12) United States Patent
Hsu

(10) Patent No.: US 8,366,077 B2
(45) Date of Patent: Feb. 5, 2013

(54) JACK STRUCTURE FOR A CLUTCH

(75) Inventor: Kun-Shan Hsu, Chiayi (TW)

(73) Assignee: Chin Jih Shern Industrial Co., Ltd., Chiayi (TW)

( * ) Notice: Subject to any disclaimer, the term of this patent is extended or adjusted under 35 U.S.C. 154(b) by 285 days.

(21) Appl. No.: 12/873,747

(22) Filed: Sep. 1, 2010

(65) Prior Publication Data

US 2012/0049141 A1 Mar. 1, 2012

(51) Int. Cl.

| | |
|---|---|
| ***B62B 3/06*** | (2006.01) |
| ***B66F 5/02*** | (2006.01) |
| ***B66F 5/04*** | (2006.01) |
| ***B66F 3/24*** | (2006.01) |
| ***B66F 3/42*** | (2006.01) |
| ***B66F 3/00*** | (2006.01) |
| ***A62B 3/00*** | (2006.01) |
| ***E21D 15/44*** | (2006.01) |

(52) U.S. Cl. .................... 254/93 R; 254/93 H; 254/8 B; 254/2 B; 254/133 R

(58) Field of Classification Search ................ 254/93 R, 254/93 H, 8 B, 2 B, 133 R; 248/600, 129; 91/180, 534, 469, 470; 60/477; 137/625.21, 137/625.22, 625.24, 625.46, 625.47

See application file for complete search history.

(56) References Cited

U.S. PATENT DOCUMENTS

| | | | | |
|---|---|---|---|---|
| 5,775,672 | A * | 7/1998 | Hsu | 251/215 |
| 6,035,635 | A * | 3/2000 | Hung | 60/481 |
| 6,042,085 | A * | 3/2000 | Tang | 254/93 H |
| 6,295,812 | B1 * | 10/2001 | Hsu | 254/93 H |
| 6,581,909 | B2 * | 6/2003 | Wixey | 254/8 B |
| 7,040,091 | B2 * | 5/2006 | Fan | 60/479 |
| 7,421,841 | B2 * | 9/2008 | Yueh | 254/8 B |
| 2003/0136125 | A1 * | 7/2003 | Hung | 60/479 |
| 2004/0065871 | A1 * | 4/2004 | Hsu | 254/8 B |
| 2010/0090143 | A1 * | 4/2010 | Kot | 251/129.15 |

* cited by examiner

*Primary Examiner* — Monica Carter
*Assistant Examiner* — Seahee Yoon
(74) *Attorney, Agent, or Firm* — Alan Kamrath; Kamrath IP Lawfirm, P.A.

(57) ABSTRACT

A jack structure for a clutch contains a main hydraulic cylinder to push a movable arm to move vertically, and a holder including a support rod actuated by an auxiliary hydraulic cylinder of the movable arm to move vertically and horizontally relative to the holder. The main hydraulic cylinder is a single acting hydraulic cylinder, and the auxiliary cylinder is a double acting hydraulic cylinder. The main hydraulic cylinder communicates with an inlet tube of the auxiliary hydraulic cylinder. A valve seat includes a pump hole to draw hydraulic oil via a valve seat cylinder, an inlet connected with the inlet tube, an outlet coupled with an outlet tube of the auxiliary hydraulic cylinder, and a bore connected with an oil tank. A control post is axially connected with the valve seat and includes plural grooves to selectively communicate with the pump hole, the inlet, the outlet, and the bore after rotation.

3 Claims, 8 Drawing Sheets

JACK STRUCTURE FOR A CLUTCH

BACKGROUND OF THE INVENTION

1. Field of the Invention

The present invention relates to a jack structure for a clutch containing a main hydraulic cylinder to push a movable arm to move vertically, and a holder including a support rod axially disposed thereon to be actuated by an auxiliary hydraulic cylinder of the movable arm to move vertically and horizontally relative to the holder, such that the main and auxiliary hydraulic cylinders are actuated by the hydraulic oil outputted from the valve seat cylinder and the control post to retract simultaneously, so that the movable arm and the support rod move vertically and respectively.

2. Description of the Prior Art

A jack for a clutch serves as a lift structure when disassembling and assembling the clutch, and, accordingly, it is an auxiliary equipment in a vehicle maintenance factory.

A conventional jack structure for the clutch is provided with a hydraulic cylinder to lift and disassemble the clutch easily so that a movable arm is actuated by the hydraulic cylinder. A support rod of the clutch axially connected with a holder is capable of positioning and moving the clutch. However, such a power driving design is only for controlling the moving arm to move vertically, and the support rod to support the clutch is still rotated in a manual forcing manner. Therefore, when the support rod has to be rotated 90 degrees during a maintenance process, a user rotates the support rod manually, thus causing a dangerous operation (since the support rod is rotated manually without being positioned, it is easy to shock and collapse). Besides, if the support rod is not forced properly by the user, it will be easy to hurt the user.

The present invention has arisen to mitigate and/or obviate the afore-described disadvantages.

SUMMARY OF THE INVENTION

The primary objective of the present invention is to provide a jack structure for a clutch that contains a main hydraulic cylinder to push a movable arm to move vertically, and a holder including a support rod axially disposed thereon to be actuated by an auxiliary hydraulic cylinder of the movable arm to move vertically and horizontally relative to the holder. The main and auxiliary hydraulic cylinders are actuated by the hydraulic oil outputted from the valve seat cylinder and the control post to retract simultaneously. Hence, the movable arm and the support rod move vertically and respectively.

A further objective of the present invention is to provide a jack structure for a clutch having the support rod capable of moving to a horizontal state relative to the holder and obtaining a positioning function to removing and maintaining the clutch easily and safely.

Another objective of the present invention is to provide a jack structure for a clutch operated in a three-section operating manner by using the control post. Thus, during lifting the jack, the support rod changes its angle to lift the movable arm, and during descending the jack, the movable arm is moved downward, and, then, the support rod is retracted, so that the jack is operated safely and easily to assemble or dissemble the clutch.

To obtain the above objectives, a jack structure for a clutch contains a main hydraulic cylinder to push a movable arm to move vertically, and a holder including a support rod axially disposed thereon to be actuated by an auxiliary hydraulic cylinder of the movable arm to move vertically and horizontally relative to the holder. The main hydraulic cylinder is a single acting hydraulic cylinder, and the auxiliary cylinder is a double acting hydraulic cylinder. The main hydraulic cylinder is in communication with an inlet tube of the auxiliary hydraulic cylinder. A valve seat includes a pump hole to draw hydraulic oil via a valve seat cylinder, an inlet connected with the inlet tube, an outlet coupled with an outlet tube of the auxiliary hydraulic cylinder, and a bore adapted to be connected with an oil tank. A control post is axially connected with the valve seat and includes a plurality of grooves to selectively communicate with the pump hole, the inlet, the outlet, and the bore after rotation. Thus, the main and auxiliary hydraulic cylinders are actuated by the hydraulic oil outputted from the valve seat cylinder and the control post to retract simultaneously. Hence, the movable arm and the support rod move vertically and respectively.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
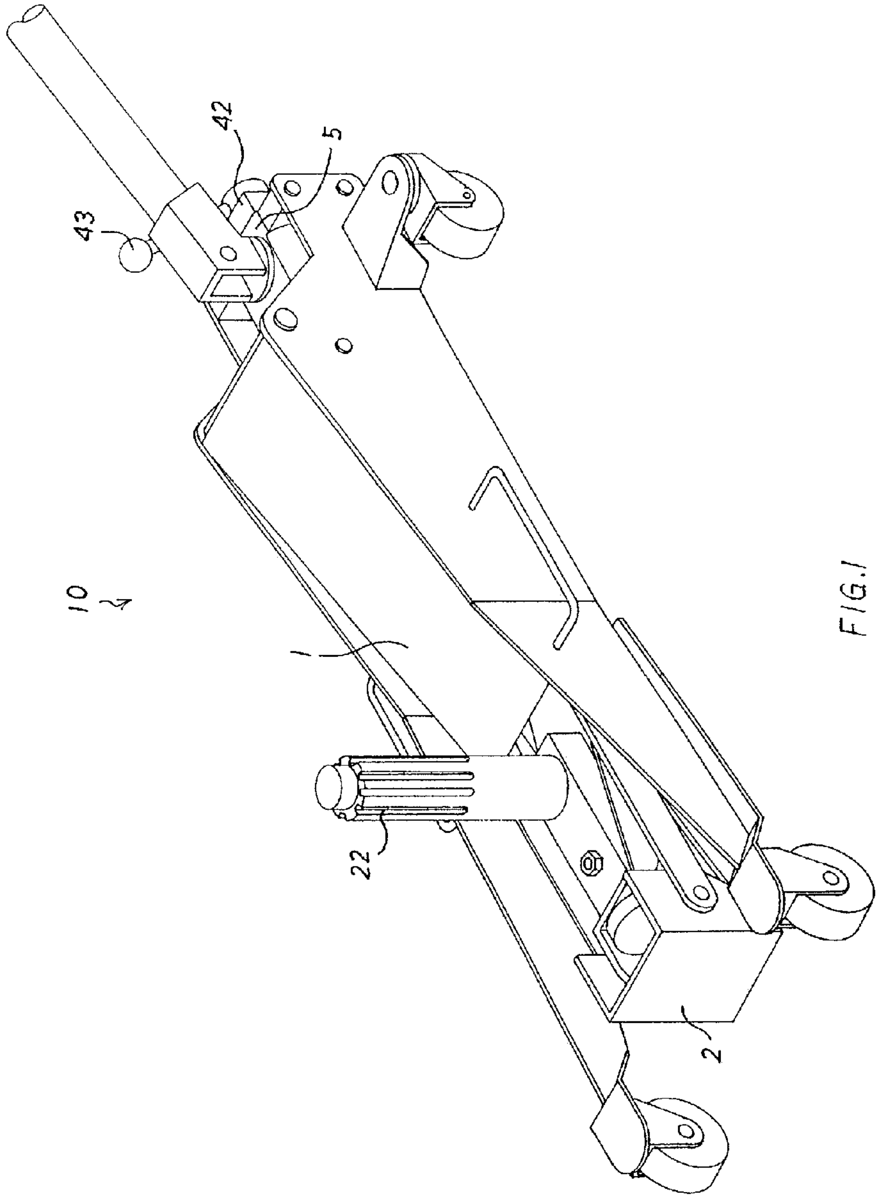
FIG. 1 is a perspective view showing the assembly of a jack structure for a clutch according to a preferred embodiment of the present invention.
Figure 2:
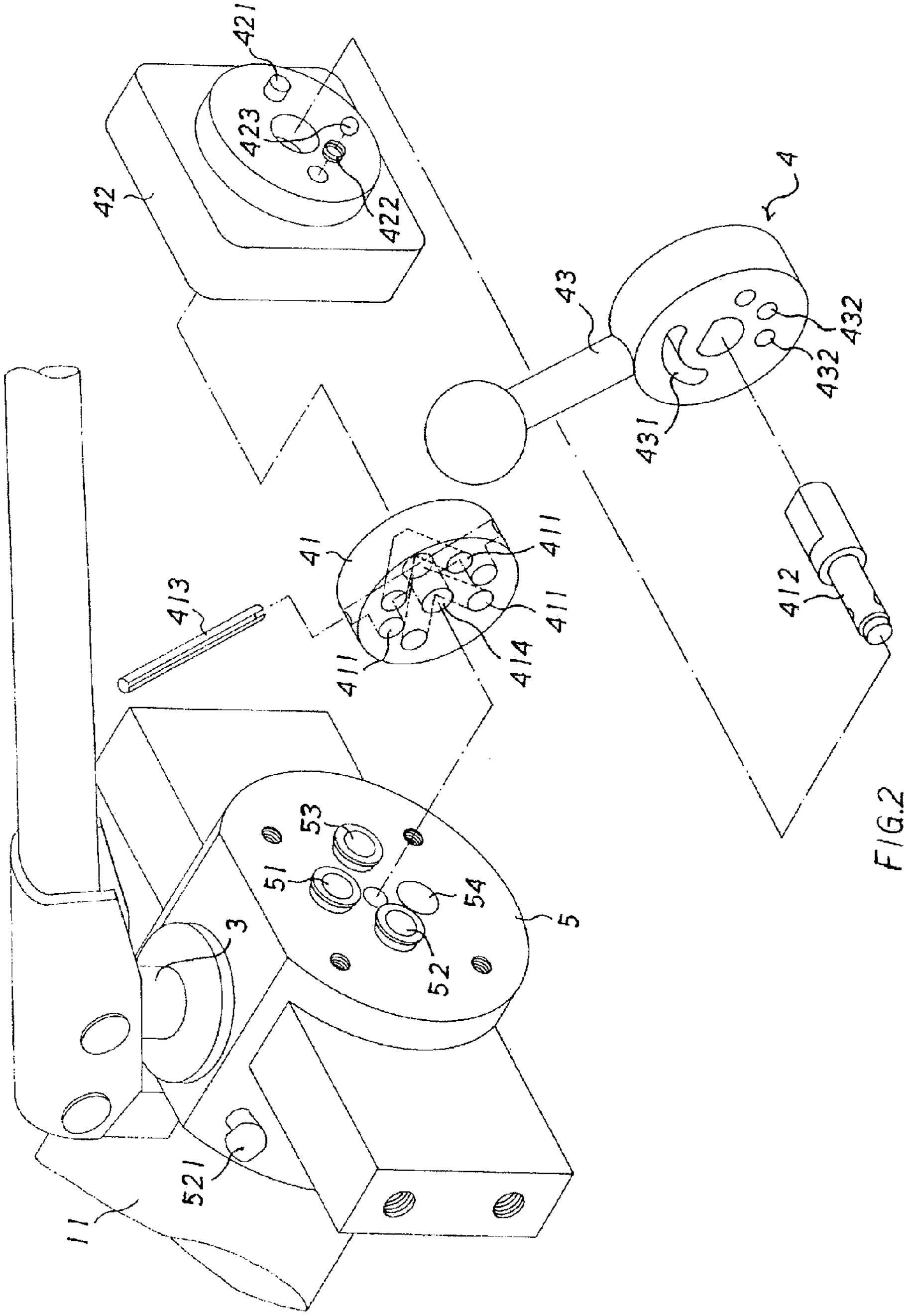
FIG. 2 is a perspective view showing the exploded components of a valve seat of the jack structure for the clutch according to the preferred embodiment of the present invention.

A jack structure 10 for a clutch according to a preferred embodiment of the present invention comprises a movable arm 1 to be pushed to move vertically by a main hydraulic cylinder 11, and a holder 2 including a support rod 22 axially disposed thereon to be actuated by an auxiliary hydraulic cylinder 21 of the movable arm 1 to move vertically and horizontally relative to the holder 2 (as shown in FIG. 1).

The main hydraulic cylinder 11 is a single acting hydraulic cylinder, and the auxiliary cylinder 21 is a double acting hydraulic cylinder. The main hydraulic cylinder 11 is in communication with an inlet tube 521 of the auxiliary hydraulic cylinder 21, and the auxiliary hydraulic cylinder 21 includes a piston with a larger diameter.

A valve seat 5 includes a pump hole 51 to draw hydraulic oil via a valve seat cylinder 3, a bore 54 adapted to be connected with an oil tank 55 to correspond to the pump hole 51, an inlet 52 connected with the inlet tube 521, and an outlet 53 coupled with an outlet tube 531 of the auxiliary hydraulic cylinder 21 to correspond to the inlet 52. The pump hole 51, the inlet 52, and the outlet 53 are extended outward from one side of the valve seat 5 to correspond to a valve member 41 so that the bore 54 communicates with the valve member 41 (because the bore 54 does not extend outward from the valve member 41, and a gap is defined between the bore 54 and the valve member 41).

A control post 4 is axially connected with the valve seat 5 and includes a plurality of grooves 411 arranged parallel to each other. The valve member 41 is axially fixed in a receiving member 42 which is coupled with the valve seat 5. A central orifice 414 of the valve member 41 is used to receive a central shaft 412 to actuate a controlling lever 43 outside the receiving member 42. The groove 411 includes the central shaft 412 and corresponds to two of the pump hole 51, the inlet 52, the outlet 53 and the bore 54 of the valve seat 5 (a C-shaped bolt 413 is connected with the central shaft 412 through the valve member 41 so that the groove 411 is in communication with the central orifice 414). Between the controlling lever 43 and the receiving member 42 is defined a positioning structure corresponding to communicate with the groove 411 (in this embodiment, a retaining bolt 421 and an arcuate recess 431 are applied to limit an angle, and a biasing ball 423, to match with a spring 422, retains with a concaved arcuation 432 to obtain a retaining function).

Figure 3C:
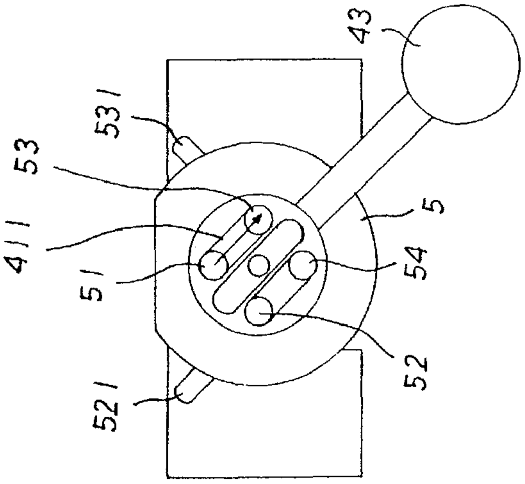
FIG. 3C is another plan view showing the operation of the control post of the jack structure for the clutch according to the preferred embodiment of the present invention.
Figure 3B:
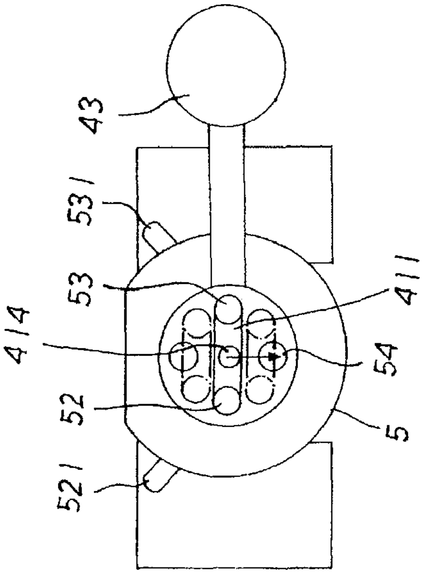
FIG. 3B is another plan view showing the operation of the control post of the jack structure for the clutch according to the preferred embodiment of the present invention.
Figure 3A:
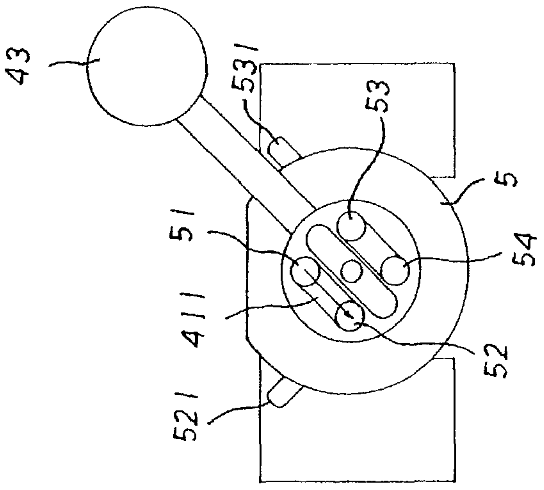
FIG. 3A is a plan view showing the operation of a control post of the jack structure for the clutch according to the preferred embodiment of the present invention.
Figure 4:
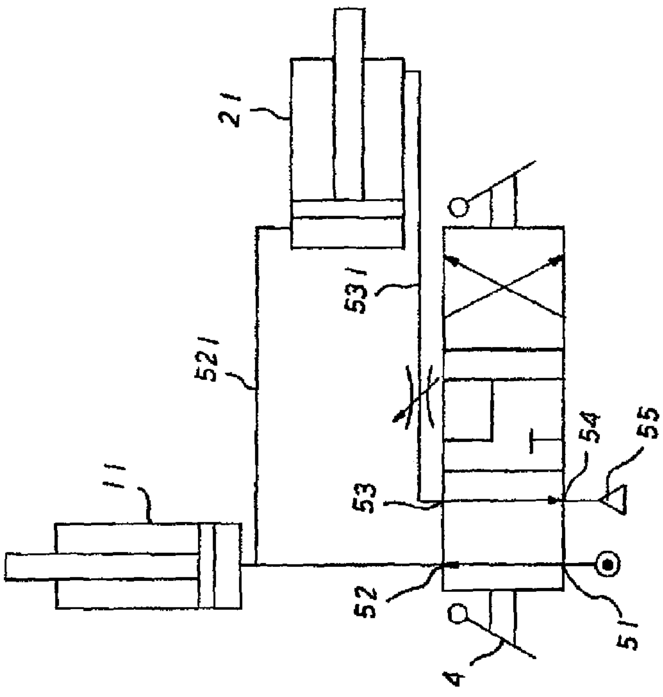
FIG. 4 is another plan view showing oil channels of the jack structure for the clutch according to the preferred embodiment of the present invention.
Figure 5:
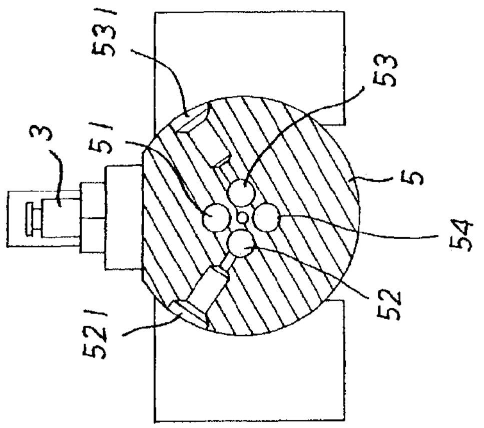
FIG. 5 is a cross sectional view showing the valve seat of the jack structure for the clutch according to the preferred embodiment of the present invention.

The controlling lever 43 actuates the valve member 41 to rotate. The pump hole 51 communicates with the inlet 52 via the groove 411 (as illustrated in FIG. 3A), the outlet 53 communicates with the bore 54 (as shown in FIG. 3B), or the pump hole 51 communicates with the outlet 53 (as shown in FIG. 3C). Thus, the main and auxiliary hydraulic cylinders 11, 21 are actuated by the hydraulic oil outputted from the valve seat cylinder 3 and the control post 4 to retract simultaneously (as illustrated in FIGS. 4 and 5. Hence, the movable arm 1 and the support rod 22 move vertically and respectively.

Figure 6:
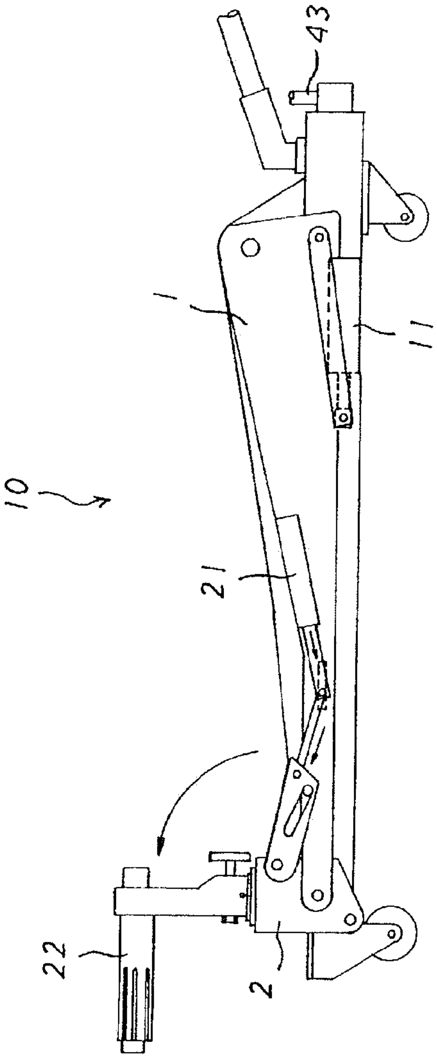
FIG. 6 is a plan view showing the operation of the jack structure for the clutch according to the preferred embodiment of the present invention.
Figure 7:
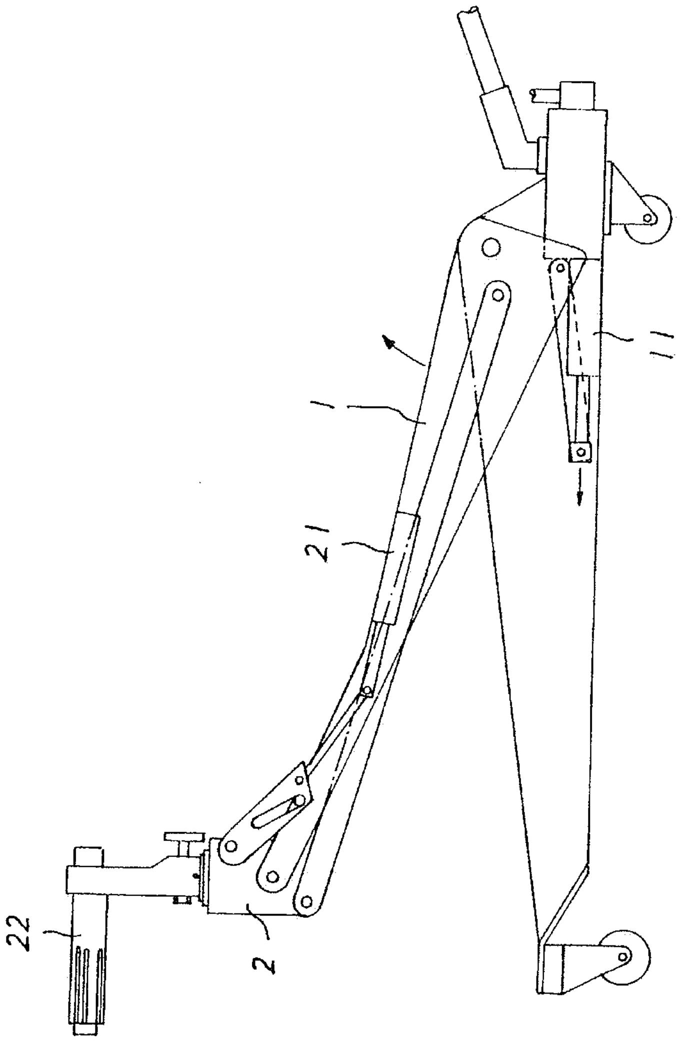
FIG. 7 is another plan view showing the operation of the jack structure for the clutch according to the preferred embodiment of the present invention.
Figure 8:
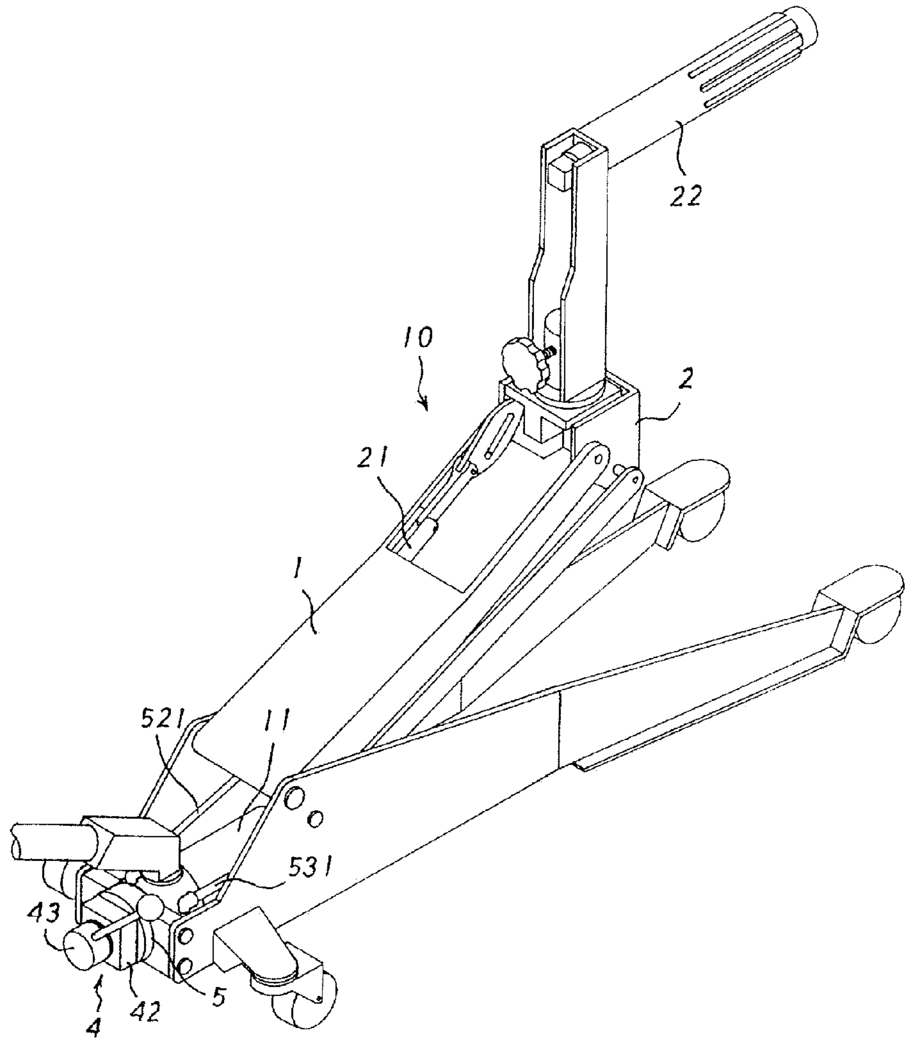
FIG. 8 is a perspective view showing the operation of the jack structure for the clutch according to the preferred embodiment of the present invention.

Therefore, the groove 411 of the valve member 41 rotates to communicate with the inlet 52 of the pump hole 51 (the outlet 53 is in communication with the bore 54), so that the cylinder 3 inputs the hydraulic oil into the inlet 52 and the inlet tube 521 from the oil tank 52 and the pump hole 51. In the meantime, an inner pressure of the auxiliary hydraulic cylinder 21 becomes smaller, because the auxiliary hydraulic cylinder 21 includes the piston with the larger diameter. The hydraulic oil pushes the auxiliary hydraulic cylinder 21 to lift the support rod 22 to a horizontal state (as shown in FIG. 6, the auxiliary hydraulic cylinder 21 is pushed toward the bottommost end), and, then, the movable arm 1 of the main hydraulic cylinder 11 is lifted (as illustrated in FIGS. 7 and 8) so that the jack 10 is aligned with the clutch to be assembled or disassembled easily. The groove 411 of the valve member 41 rotates to communicate with the inlet 52 and the outlet 53, so that the bore 54 is conducted (because the groove 411 is capable of communicating with the central orifice 414 and includes the gap to flow the hydraulic oil, the bore 54 is conducted), and the main hydraulic cylinder 11 to load the movable arm 1 and the auxiliary hydraulic cylinder 21 withdraws the hydraulic oil and retracts backward so that the hydraulic oil in the main hydraulic cylinder 11 along the inlet 52 flows back to the outlet 53 and the bore 54 (in the channel where the hydraulic oil flows back to the bore 54 is provided with a flow limiting valve to lower the flowing speed of the hydraulic oil to slow a descending speed of the movable arm 1), thus moving the movable arm 1 downward (the support rod 22 is still located at a dead point of the auxiliary hydraulic cylinder 21 without returning to its original position automatically) to remove the clutch easily. After the groove 411 of the valve member 41 communicates with the pump hole 51 and the outlet 53 and after the inlet 52 communicates with the bore 54, the hydraulic oil is inputted into the outlet tube 531 via the cylinder 3 so that the auxiliary hydraulic cylinder 21 retracts backward, and the support rod 22 in the horizontal state returns back to a vertical state. Hence, the clutch is maintained conveniently by the user or moved easily by using the jack 10.

Thereby, the jack 10 is operated in a three-section operating manner by using the control post 4. Thus, during lifting the jack 10, the support rod 22 changes its angle to lift the movable arm 1, and during descending the jack 10, the movable arm 1 is moved downward, and, then, the support rod 22 is retracted so that the jack 10 is operated safely and easily to assemble or dissemble the clutch.

While various embodiments in accordance with the present invention have been shown and described, it is clear to those skilled in the art that further embodiments may be made without departing from the scope of the present invention.

What is claimed is:

1. A jack structure for a clutch comprising:

a main hydraulic cylinder to push a movable arm to move vertically;

a holder including a support rod axially disposed thereon to be actuated by an auxiliary hydraulic cylinder of the movable arm to move vertically and horizontally relative to the holder, wherein the main hydraulic cylinder is a single acting hydraulic cylinder, wherein the auxiliary cylinder is a double acting hydraulic cylinder, wherein the main hydraulic cylinder is in communication with an inlet tube of the auxiliary hydraulic cylinder;

a valve seat including a pump hole to draw hydraulic oil via a valve seat cylinder, an inlet connected with the inlet tube, an outlet coupled with an outlet tube of the auxiliary hydraulic cylinder, and a bore adapted to be connected with an oil tank;

a control post axially connected with the valve seat and including a plurality of grooves to selectively communicate with the pump hole, the inlet, the outlet, and the bore after rotation, wherein the main and auxiliary hydraulic cylinders are actuated by hydraulic oil outputted from the valve seat cylinder and the control post to retract simultaneously, wherein the movable arm and the support rod move vertically and respectively.

2. The jack structure for the clutch as claimed in claim 1, wherein the bore corresponds to the pump hole, wherein the outlet corresponds to the inlet, wherein the pump hole, the inlet, and the outlet are extended outward from one side of the valve seat to correspond to a valve member, and wherein the bore communicates with the valve member.

3. The jack structure for the clutch as claimed in claim 1, wherein a valve member is axially fixed in a receiving member coupled with the valve seat, wherein a central orifice of the valve member is used to receive a central shaft to actuate a controlling lever outside the receiving member, and wherein between the controlling lever and the receiving member is defined a positioning structure corresponding to communicate with the groove.

* * * * *